(12) United States Patent
Deslypper

(10) Patent No.: US 11,142,309 B2
(45) Date of Patent: Oct. 12, 2021

(54) CONVERTIBLE AIRPLANE WITH EXPOSABLE ROTORS

(71) Applicant: Christian Roger Rene Deslypper, Vaureal (FR)

(72) Inventor: Christian Roger Rene Deslypper, Vaureal (FR)

(*) Notice: Subject to any disclaimer, the term of this patent is extended or adjusted under 35 U.S.C. 154(b) by 338 days.

(21) Appl. No.: 15/572,184

(22) PCT Filed: May 4, 2016

(86) PCT No.: PCT/FR2016/000084
§ 371 (c)(1),
(2) Date: Nov. 7, 2017

(87) PCT Pub. No.: WO2016/181044
PCT Pub. Date: Nov. 17, 2016

(65) Prior Publication Data
US 2018/0141652 A1   May 24, 2018

(30) Foreign Application Priority Data

May 11, 2015 (FR) ...................................... 1500973

(51) Int. Cl.
*B64C 29/00* (2006.01)
*B64C 17/06* (2006.01)
*B64C 3/38* (2006.01)
*B64D 27/24* (2006.01)

(52) U.S. Cl.
CPC ............ *B64C 29/0025* (2013.01); *B64C 3/38* (2013.01); *B64C 17/06* (2013.01); *B64D 27/24* (2013.01)

(58) Field of Classification Search
CPC ..... B64C 27/22–30; B64C 39/12; B64C 3/38; B64C 3/52–56
See application file for complete search history.

(56) References Cited

U.S. PATENT DOCUMENTS

| 3,083,935 | A | | 4/1963 | Piasecki |
| 3,139,244 | A | * | 6/1964 | Bright ................. B64C 29/0025 244/12.3 |
| 4,828,203 | A | | 5/1989 | Clifton et al. |
| 6,886,776 | B2 | * | 5/2005 | Wagner .................... B64C 3/56 244/12.4 |

(Continued)

FOREIGN PATENT DOCUMENTS

DE    102006019300 A1    10/2007
WO      2006113877 A2    10/2006

*Primary Examiner* — Magdalena Topolski
*Assistant Examiner* — Marisa V Conlon

(57) ABSTRACT

Convertible-type aircraft, able to fly with the speed and the reduced operating costs of a fixed-wing aircraft and also to take-off/land vertically and hover/manoeuvre like an helicopter.
The aircraft object of the invention comes in the form of a classical plane, with a fuselage (1), a fixed wing (2), an horizontal stabilizer (3) and a vertical fin (4), as well as one or several jet engines or turboprops (5) for propulsion and it comprises exposable rotors (6 and 7) installed inside the wing and possibly inside the horizontal stabilizer or the fuselage for lifting the aircraft for vertical take-off/landing and stationary flight.
For the flight and the horizontal take-off/landing, the rotors are completely enclosed inside the wing and possibly inside the horizontal stabilizer or the fuselage.

7 Claims, 2 Drawing Sheets

(56) References Cited

U.S. PATENT DOCUMENTS

| | | | |
|---|---|---|---|
| 7,032,861 B2* | 4/2006 | Sanders, Jr. et al. | ... B64C 27/12 |
| 7,857,254 B2* | 12/2010 | Parks | ...... B64C 15/00 |
| | | | 244/12.4 |
| 8,607,613 B2* | 12/2013 | Kerbiquet | ............ G01C 25/005 |
| | | | 73/1.78 |
| 8,936,212 B1* | 1/2015 | Fu | ............ B64C 3/56 |
| | | | 244/6 |
| 9,856,018 B2* | 1/2018 | King | ............ B64C 29/0025 |
| 2007/0018035 A1 | 1/2007 | Salz et al. | |
| 2018/0044014 A1* | 2/2018 | Sapargaliyev | ............ B64C 3/56 |

* cited by examiner

CONVERTIBLE AIRPLANE WITH EXPOSABLE ROTORS

TECHNICAL FIELD

The object of the present invention is a convertible-type aircraft, able to fly like a plane thanks to a fixed wing and to take-off/land vertically but also to hover and manoeuvre like an helicopter, thanks to several rotors.

BACKGROUND ART

Numerous concepts of convertible aircraft have already been built or patented, essentially for attempting to obtain the speed and the reduced operating costs of a fixed-wing aircraft, together with the capability of taking off/landing vertically, which makes the helicopter, in spite of its drawbacks (limited speed, high operating costs, range), the only aircraft available nowadays for certain applications:
- civil transportation of passagers or equipment towards and from sites not permitting to horizontally land or take-off, like for example the oil rigs, the buildings located in urban areas or the confined areas,
- medical evacuation, directly from the site of an accident,
- SAR (Search And Rescue) activities, for which it is necessary to reach as fast as possible the site where persons are to be rescued, to hover above these rescuees in order to be able to embark them aboard the machine and to bring them rapidly to an hospital,
- military missions (tactical transport of troops or equipment towards sites without landing strip.

In the category of «convertible aircraft for transporting 10 to 30 passengers or equipment for an equivalent load», very few machines passed the prototype stage: the Boeing-Bell V-22 Osprey (military), the AgustaWestland AW609 (civil/governmental) and the Kamov Ka-22 (the latter having been made in 3 units only and abandoned in 1964). All these machines, like the equivalent helicopters, are of a great complexity and are consequently very expensive to buy and maintain, they are also costly to operate, due to a poor fuel efficiency. Moreover, their control during transitions between vertical and horizontal flight is delicate and their performance is perfectible (rotors can't be optimized for both types of flight for the V-22 and AW609, drag of rotor in horizontal flight was very high for the Ka-22). Lastly, these machines are not really able to manoeuvre when hovering and above all have the drawback of having the exhaust of their turbines orientated downwards, which in practice forbids their use for SAR missions, or for landing on oil rigs, ships or buildings.

DESCRIPTION OF THE INVENTION

As the convertible-type aircraft object of the present invention differs from the other convertible aircraft already produced by its capability of flying and manoeuvring while hovering, it is therefore named «hoverplane».

For the aforementioned applications, the hoverplane appears superior to the helicopter, as its principle confers it, in addition to the vertical take-off/landing capabilities and manoeuvrability in hovering of an helicopter, the specific advantages of a fixed-wing aircraft:
- for the passengers: speed, comfort (less noise and vibrations), safety (several helicopters were lost further to a breakage of the rotor or a failure of the transmission leading to a more or less abrupt loss of lift and hence the fall or the emergency landing of the helicopter, this type of accident being far more unlikely on a fixed-wing aircraft),
- for the operator: lower life cycle costs, safety.

Meanwhile, the main advantage of the hoverplane object of the invention with respect to the helicopter is its technical simplicity, resulting for the aircraft manufacturer in reduced engineering/development and manufacturing costs and allowing for the operator significantly reduced acquisition and maintenance costs together with reduced operating costs due to a better fuel efficiency.

BRIEF DESCRIPTION OF THE DRAWINGS

The drawings in appendix illustrate the invention.

Figure 1:
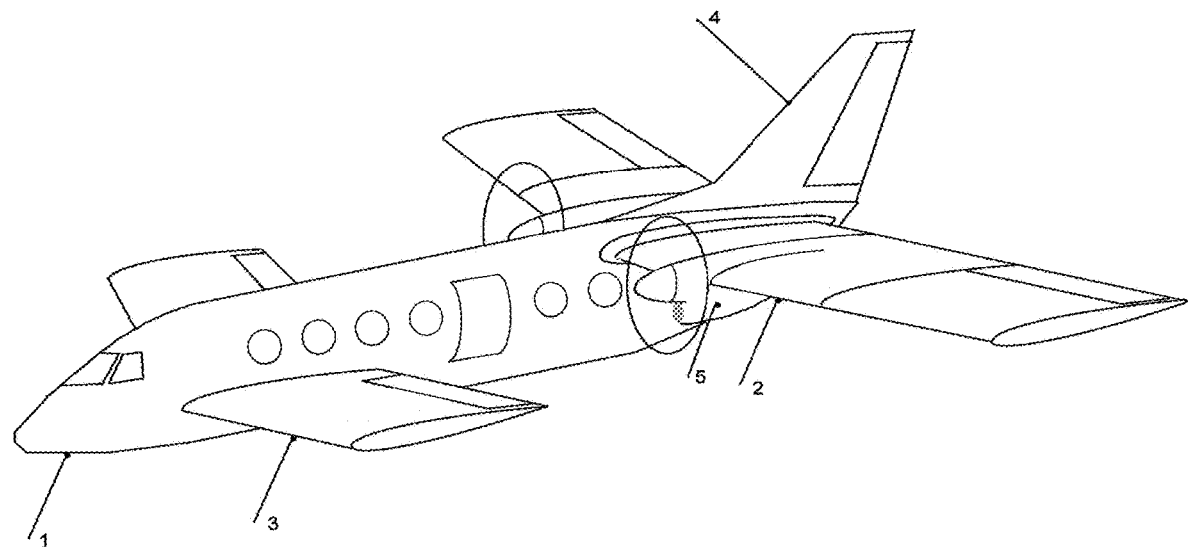
FIG. 1 represents the hoverplane in «airplane» configuration.

As illustrated by FIG. 1, the hoverplane comes in the form of a «classical» plane, with a fuselage (1) in which the passengers (or the equipment to be carried) take place as well as the crew, a fixed wing (2), an horizontal stabilizer (3) and a vertical fin (4). The characteristics of the wing (airfoil, aspect ratio, incidence, . . . ) and of the horizontal stabilizer are optimized for the flight in «airplane» mode, in order to achieve the best performance in speed and/or fuel efficiency and permit horizontal take-off or landing. The propulsion is performed through one or several jet engines or turboprops depending on the targeted speed range. In the example illustrated by FIG. 1, a twin turboprop (5) configuration is represented.

Inside the wing and the horizontal stabilizer (or possibly the fuselage), a system of rotors (6 and 7) is installed, the rotation axis of these rotors being vertical and either fixed or able of being slightly tilted rearwards/backwards and laterally. These rotors are powered either by motors independent of the propulsion engines (in this case preferably with one motor for each rotor), or from the propulsion engines by means of a transmission system. In the example illustrated by FIG. 2, a 4-rotor configuration is represented, but a 3-rotor configuration is also possible, the third rotor being then installed inside the fuselage like in the F-35. Likewise, configurations with 6 rotors (as in FIG. 3), or 8 rotors or even 5 rotors are also possible, they permit to use rotors with a smaller diameter, to the benefit of the characteristics of the wing, which can then present higher aspect ratio and taper values.

For the flight and take-off/landing in airplane mode, the configuration of the hoverplane is the one of FIG. 1: the rotors are completely enclosed inside the wing and the horizontal stabilizer (or fuselage), which permits to avoid any aerodynamic drag.

Figure 2:
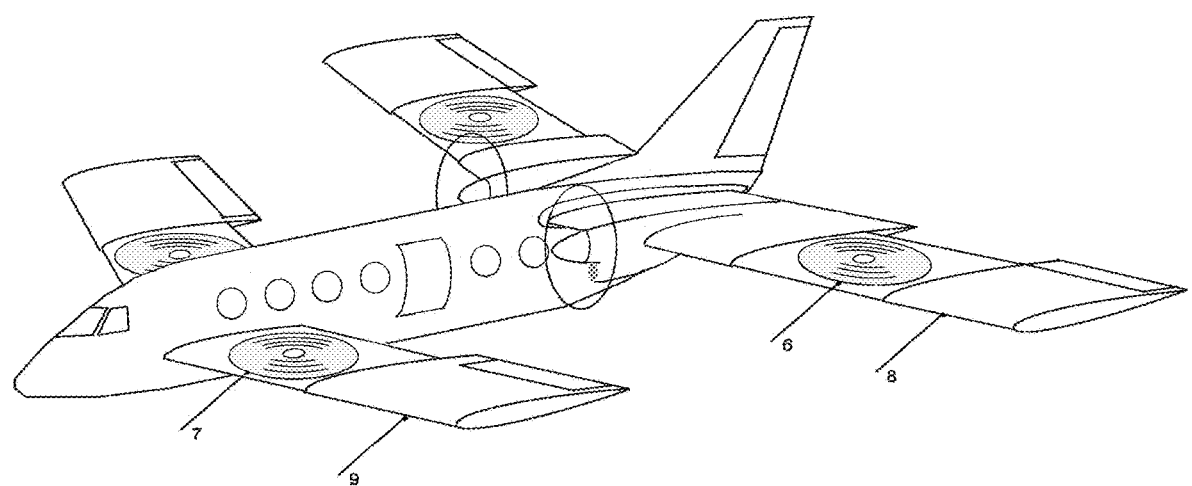
FIG. 2 represents the hoverplane in «helicopter» configuration, i.e. during the vertical take-off/landing and hovering phases.
Figure 3:
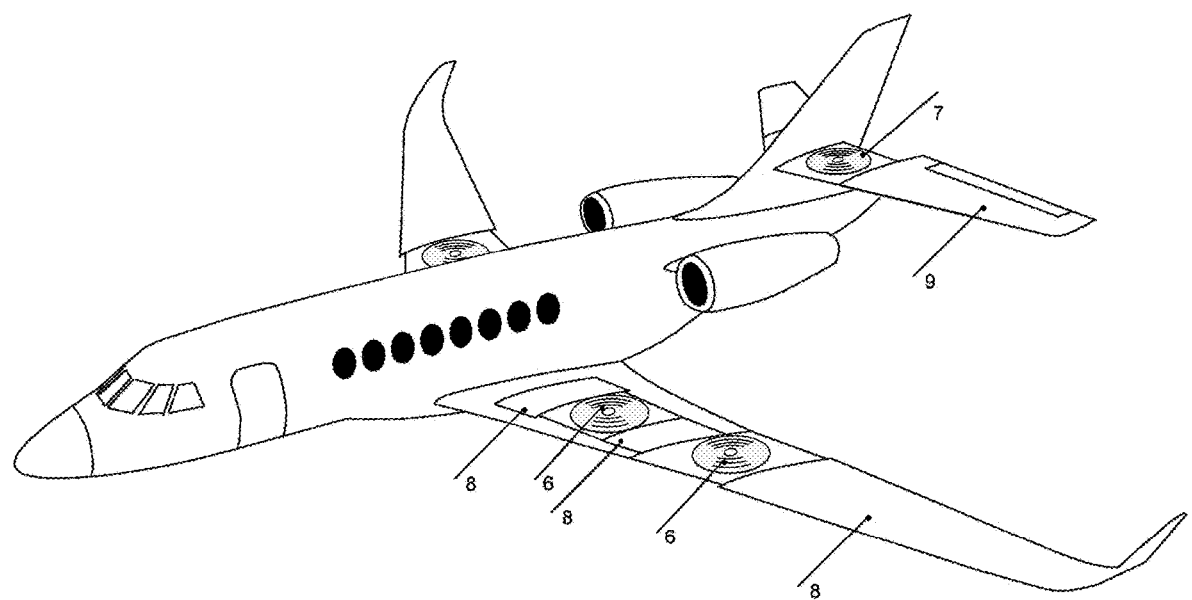

As illustrated by FIG. 2 or 3, for the vertical take-off/landing and hovering, sliding panels (8 and 9) above/under and at the tip of the wing and horizontal stabilizer (and possibly above/under the fuselage, not illustrated) allow to uncover the rotors, which then lift the hoverplane. These panels can constitute the tip section of the wing or of the horizontal stabilizer and then slide beyond the position of the tip of the wing or of the horizontal stabilizer as it is in the «airplane» configuration.

The size and the retraction mode of these panels permit the wing or the horizontal stabilizer to have at least the same lifting surface with the panels open than with the panels closed. This characteristic makes the transition between horizontal and vertical or stationary flight easier.

In order to be completely enclosed inside the wing and the stabilizer (or inside the fuselage in the 3- or 5-rotor configurations, the rotors are of a significantly smaller diameter than in an helicopter or a V-22 or AW609 convertible aircraft. They consequently spin faster, which ensures a great stability in the horizontal plane. In the same manner, the rotors on each side of the hoverplane are contra-rotating, which generates a high level of stability in yaw. The hoverplane hence features a high «intrinsic» stability, permitting to achieve by simple means (as they only have to act at the second rate) a perfect stabilization of the flight in hover or during vertical take-off/landing.

In the example illustrated by FIG. 2, the propulsion airscrews may spin during hovering flight or vertical take-off/landing, in order to increase the intrinsic stability of the hoverplane. However, they do not generate any thrust during such flight, as their pitch is then set to zero, except if a forward/rearward motion or an orientation in yaw are desired.

Control of hovering flight is performed in acting identically or differentially on the speed (only in the case of rotors powered by independent motors) or on the pitch of the different rotors:
- an identical action on each of the rotors makes the hoverplane ascend or descent,
- a differential action on rotors located on different sides makes the hoverplane move laterally,
- a differential action on front and aft rotors (in the case of a configuration with at least 3 rotors) or an identical action on the propulsion airscrews makes the hoverplane move forward or backwards,
- a differential action on the speed of the different rotors (only in the case of rotors powered by independent motors) or a differential action on the pitch of the propulsion airscrews orientates the hoverplane in yaw.

In the configurations where the axis of the rotors can be tilted, the movement forward, backwards or laterally, as well as the orientation in yaw, are obtained by acting on the tilting of the rotors.

The hoverplane in stationary flight is hence at the same time stable, manoeuvrable and easy to control, these qualities, particularly appreciated in SAR-type missions, being in addition obtained by simple means, relatively inexpensive to develop and produce. The design of the hoverplane also ensures a high stability in the transition phases from vertical to horizontal flight and vice-versa, the overall geometry of the aircraft and the arrangement of the rotors allowing the thrust center of the lifting surfaces and the one of the various rotors to be nearly confused, which avoids generation of any dangerous upward or downward moment that would have to be compensated, either manually by the pilot or automatically by a system for which the development cost could be important.

During transition from the stationary flight to the horizontal flight, the pilot has only to increase the thrust of the propulsion engines. The flight controls system manages the lift generated by the rotors as the airspeed of the hoverplane, and hence the lift generated by the wing, increases. Once a sufficient airspeed is reached, the power supplied to the rotors is progressively reduced and the sliding panels on the wings (and possibly on the horizontal stabilizer and/or the fuselage) closed. The rotor system then does no longer generate any parasitic drag and the hoverplane becomes a pure airplane again, with the specific advantages of the fixed-wing aircraft compared to the helicopter for what concerns flight: speed, comfort, economy, safety.

Transition from the horizontal flight to the stationary flight is performed in a symmetrical manner: the pilot decelerates in reducing or inverting the thrust of the propulsion engines until the aircraft ground speed is equal to zero. The flight controls system manages the lift generated by the rotors as the airspeed of the hoverplane, and hence the lift generated by the wing, decreases. Once a sufficiently low airspeed is reached, the sliding panels on the wings (and possibly on the horizontal stabilizer and/or the fuselage) open and power is supplied to the rotors, in order to generate a lifting force which progressively becomes equal to the aircraft weight.

The design and the technology of the hoverplane hence allow it to distinguish itself from the other convertible aircraft of same category by:
- its performance in terms of speed and reduced operating costs, close to those of a fixed-wing aircraft (its payload being however reduced compared to a fixed-wing aircraft due to the weight of the rotors and of their powerplant), thanks to a better optimization of the propulsion system as this system has not to perform the lifting function,
- its stationary flight capabilities, identical to those of an helicopter fitted with a SAR-mode capable autopilot allowing control of movement by the hoist operator while hovering, these capabilities, as well as its vertical take-off/landing capabilities being not burdened by any problem created by the turboprop exhaust, as this exhaust is not turned downwards during vertical take-off/landing or stationary flight,
- its capability of taking off/landing like an airplane for reducing fuel consumption.

BEST MODE FOR CARRYING OUT THE INVENTION

The primordial advantage of the hoverplane with respect to convertible aircraft or helicopters of same category is the considerably higher simplicity of the system allowing vertical and stationary flight, which leads to significantly lower acquisition and maintenance costs.

A possible realization of the hoverplane could actually use for the lifting function 4 rotors arranged like in the example illustrated by FIG. 2, these 4 rotors being driven by great torque, high efficiency electric motors, which are also lightweight and of a reduced volume compared with their power, with a considerably lower cost and maintenance than a turbo engine. The 4 rotors could then be fixed-pitch and fixed-axle, which greatly simplifies the realization and increases its reliability (these rotors could then be made of moulded carbon fibre, with a considerably lower cost than an helicopter rotor or a turbofan engine fan), manoeuvrability and stability in stationary flight being achieved only by differential variation of the speed of each motor under the control of a very simple stabilization system, similar to the systems used on the general public «drones» intended for aerial photography. Based on a set of 3 gyrometers+3 accelerometers, these systems can ensure a very efficient stabilization of the aircraft attitude, and also of its position if they include a GPS. The electric motors driving the lifting rotors could be supplied with power by an electrical accumulator of Lithium-Ion type or any other high energy density technology, which capacity (and therefore mass and volume) can be limited according to the expected length of the mission phase where the rotors will be used, with the possibility to load this accumulator by means of a generator driven by the propulsion engines.

I claim:

1. A convertible aircraft operable to transition between a vertical take-off or landing (VTOL) mode, a hover mode, and a horizontal flight mode, the aircraft comprising:
a fuselage
one or more jet or turboprop engines configured to provide propulsion for the aircraft in the horizontal flight mode;
a fixed wing and a horizontal stabilizer, configured to provide lift for the aircraft in the horizontal flight mode;
a system of at least four exposable lifting rotors, configured to provide all of the lift for the aircraft in the VTOL mode and in the hover mode, wherein two of said lifting rotors are installed inside the horizontal stabilizer and the other of said lifting rotors are installed inside the wing;
sliding panels disposed on upper and lower surfaces of each of the wing and horizontal stabilizer and at the tips of each of the wing and horizontal stabilizer, wherein:
during the VTOL and hover modes, the sliding panels are configured to be in an extended position and expose the lifting rotors, the lifting rotors thereby lifting the aircraft,
during the horizontal flight mode, the sliding panels are configured to be in a retracted position and cover the rotors, and
during a transition mode in which the aircraft transitions between the VTOL mode and the horizontal flight mode, or between the hover mode and the horizontal flight mode, the sliding panels are configured to move between the extended and retracted positions;
electric motors for driving the lifting rotors;
a control and stabilization system configured to control the VTOL mode, the hover mode, and the transitions of the aircraft between the VTOL mode and the horizontal flight mode, or between the hover mode and the horizontal flight mode,
wherein the control and stabilization system comprises a set of three gyrometers and three accelerometers and a global positioning system (GPS), wherein the control and stabilization system is configured to:
determine an attitude, position, and altitude of the aircraft based on the three gyrometers, the three accelerometers, and the GPS,
during the VTOL mode and the hover mode, control a speed of each of the lifting rotors based on the attitude, position, and altitude of the aircraft, and
during the transition mode:
control a speed of each of the lifting rotors based on the attitude, position, altitude, and airspeed of the aircraft, and
control movement and placement of each of the sliding panels between the extended position and the retracted position based on the airspeed of the aircraft.

2. The aircraft of claim 1, wherein:
the lifting rotors are fixed-pitch lifting rotors, each having a fixed rotation axis, and
each of the lifting rotors is powered by a respective one of the electric motors independently of the one or more jet or turboprop engines.

3. The aircraft of claim 2, wherein each of the lifting rotors is completely enclosed inside the respective wing or the horizontal stabilizer.

4. The aircraft of claim 2, wherein the at least four exposable lifting rotors comprise:
a left stabilizer lifting rotor installed inside the horizontal stabilizer on a left side of the fuselage;
a left wing lifting rotor installed inside the wing on the left side of the fuselage;
a right stabilizer lifting rotor installed inside the horizontal stabilizer on a right side of the fuselage; and
a right wing lifting rotor installed inside the wing on the right side of the fuselage;
wherein the left stabilizer lifting rotor is contra-rotating with respect to the left wing lifting rotor, and the right stabilizer lifting rotor is contra-rotating with respect to the right wing lifting rotor; and
wherein the left stabilizer lifting rotor is contra-rotating with respect to the right stabilizer lifting rotor, and the left wing lifting rotor is contra-rotating with respect to the right wing lifting rotor.

5. The aircraft of claim 1, wherein:
the sliding panels constitute a tip section of the respective wing or horizontal stabilizer,
each of the sliding panels is configured so that the respective tip section is further from the fuselage in the VTOL, hover, and transition modes than in the horizontal flight mode, and
the wing and the horizontal stabilizer each has at least the same lifting surface when the panels are in the extended position as when the panels are in the retracted position.

6. The aircraft of claim 1, wherein during the hover mode, the control and stabilization system is configured to control movement of the aircraft forward or backward or laterally or its orientation in yaw, in response to pilot input, by controlling the speed of each of the lifting rotors.

7. The aircraft of claim 6, wherein during the hover mode, the control and stabilization system is configured to automatically maintain an attitude, position, and altitude of the aircraft in spite of wind or turbulence, by controlling the speed of each of the lifting rotors.

* * * * *